No. 658,311. Patented Sept. 18, 1900.
W. BARCLAY.
UNLOADER FOR WAGONS.
(Application filed June 6, 1900.)
(No Model.) 3 Sheets—Sheet 2.

Witnesses:
F. L. Ourand
F. G. Radelfinger.

Inventor.
Woodson Barclay,
By Lewis Payyn
Attorneys.

No. 658,311. Patented Sept. 18, 1900.
W. BARCLAY.
UNLOADER FOR WAGONS.
(Application filed June 6, 1900.)
(No Model.) 3 Sheets—Sheet 3.

Witnesses
F. L. Ourand.
F. G. Radelfinger.

Inventor.
Woodson Barclay.
By Saul Baggu & Co,
Attorneys.

UNITED STATES PATENT OFFICE.

WOODSON BARCLAY, OF COVELL, ILLINOIS.

UNLOADER FOR WAGONS.

SPECIFICATION forming part of Letters Patent No. 658,311, dated September 18, 1900.

Application filed June 6, 1900. Serial No. 19,263. (No model.)

*To all whom it may concern:*

Be it known that I, WOODSON BARCLAY, a citizen of the United States, residing at Covell, in the county of McLean and State of Illinois, have invented new and useful Improvements in Unloaders for Wagons, of which the following is a specification.

My invention relates to methods and means for unloading wagons, and more specifically to a method of unloading wagons by means of a conveyer.

The object of my invention is to provide an improved means for unloading a wagon which may be used in combination with an elevator or conveyer and the load thus stored away in the loft of a barn or in a crib.

My device is particularly adapted to be applied to wagons for hauling loose grain or corn on the ear; but it may also be attached to wagons for transporting other kinds of produce or materials.

My improved unloader combines the advantages of efficiency, economy, and expedition in operation.

Figure 1:
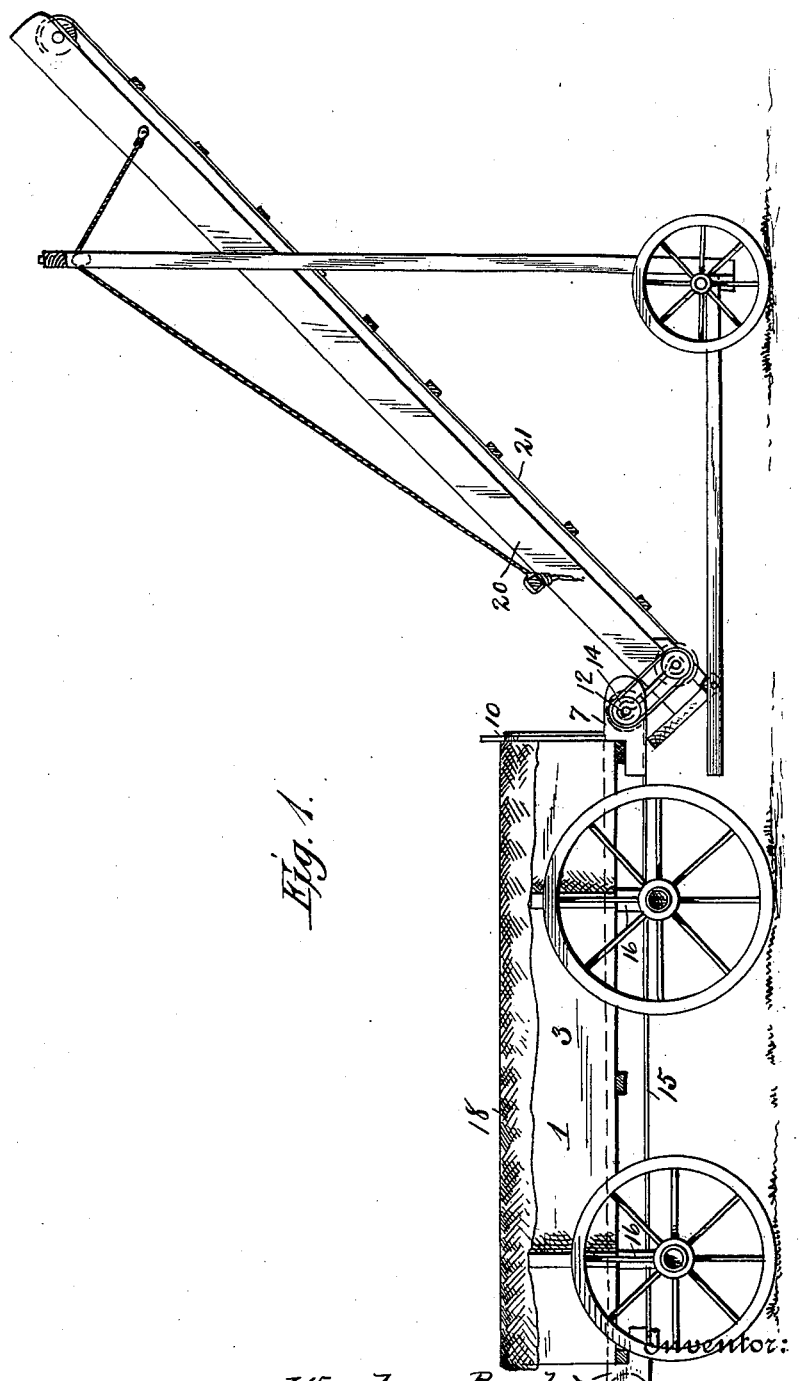
Figure 2:
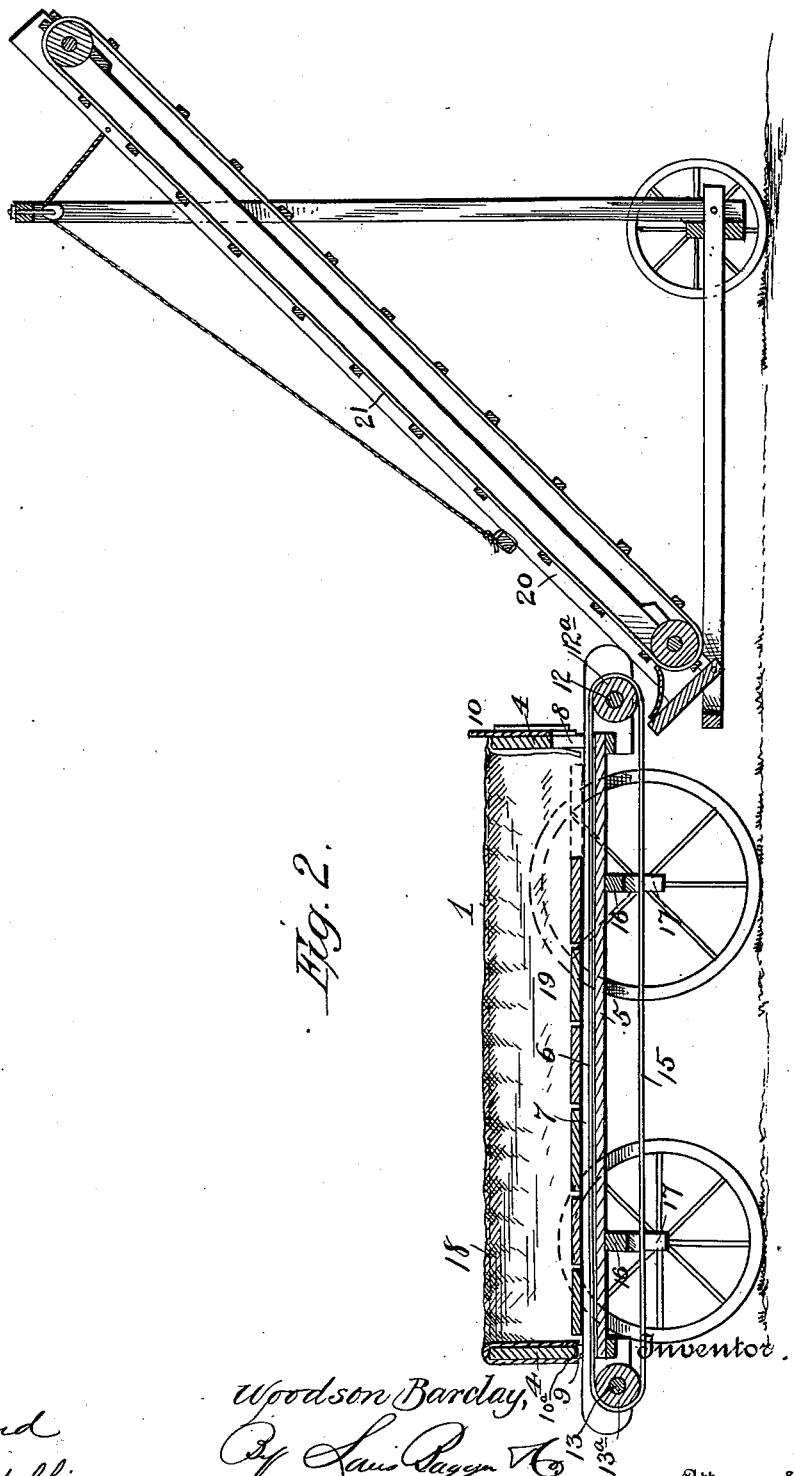
Figure 3:
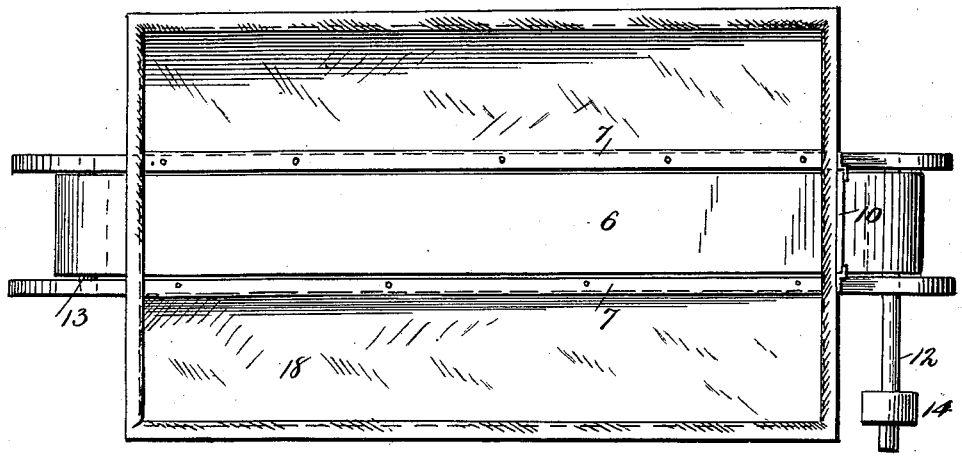
Figure 4:
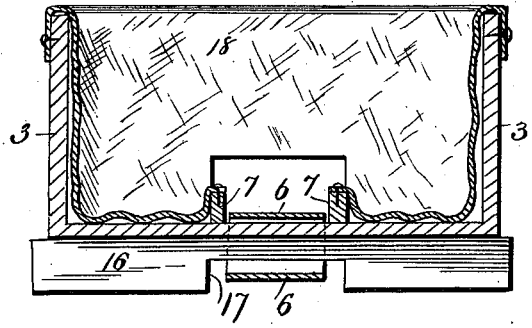

In the drawings which accompany this specification and of which they form a part, Figure 1 is a side elevation of my invention attached to a wagon and in combination with an elevator. Fig. 2 is a longitudinal section of the same, with the elevator. Fig. 3 is a plan view of the wagon with the false bottom removed. Fig. 4 is a transverse section of the same.

In the drawings like numerals of reference denote like parts wherever they occur.

The numeral 1 designates a wagon-box, having sides 3, ends 4, and a bottom 5. A conveyer 6 is mounted in the wagon-box 1 and rigidly secured to the bottom 5 thereof. The side pieces 7 of the conveyer 6 are notched in and secured to the bottom 5 and extend each way through openings 8 and 9 in the ends 4. The opening 8 is large enough to permit the grain to be carried through it by the conveyer 6, and is provided with an end-gate 10; but the opening 9 is smaller and the top $10^a$ fits snugly the conveyer, so as to make the box grain-tight when the false bottom, to be hereinafter described, is put in. Journaled in the projecting ends of the side pieces 7, at the points 11, are shafts 12 and 13, fitted with rollers $12^a$ and $13^a$, respectively. The shaft 12 has keyed to one end a pulley 14, which may be operated by means of horse-power or arranged to be actuated by hand. A belt or apron 15 is stretched on the rollers $12^a$ and $13^a$ to serve as a conveyer for the grain in the process of unloading the wagon. The bolsters 16 are notched at 17 to permit the belt to run without chafing. Secured to the sides 7 is a flexible lining 18 for the wagon-box, consisting of canvas or other suitable material. This lining 18 is tucked in at the corners and fits neatly the inner contour of the wagon-box 1 and extends over the sides of the wagon. This lining is designed to make the box tight and to expedite the unloading, as will be hereinafter fully set forth. A false bottom consisting of the transversely-extending boards 19 is provided. This bottom prevents too much of the load from coming on the belt 15 at one time, and thus stopping the conveyer.

An elevator of approved design is shown in combination with the wagon, fitted with my device. The outer end of the conveyer 6 projects into the elevator-box 20, and thus delivers the grain onto the elevator-belt 21, from whence it is carried to the place desired.

In using my improved unloader the false bottom is first laid in the wagon and the wagon then filled with grain or any other substance and taken to the place desired and then backed up to the elevator, as shown in Fig. 1. The pulley 14 and the elevator-pulley are then connected to a horse-power, the end-gate 10 removed, and the rear board 19 of the false bottom taken up. The grain will then fall upon the belt 15 and be carried out and deposited upon the elevator-belt. The remaining boards 19 of the false bottom are now taken up in order, one after the other. After all the boards have been removed grain will still remain banked up against the sides 3. This grain is now unloaded by grasping the lining 18 near the top of the sides 3 and pulling it taut, thereby dumping the grain on the belt 15. In this way the last bit of grain can be removed from the wagon without the use of a shovel or other implement.

I do not wish to be limited as to details of construction, as these may be modified in many particulars without departing from the spirit of my invention.

The use of my conveyer is not to be understood as being limited to the combination with a wagon-box, but it may be attached to any other box or bin, such as a corn-crib. It may also be used in other ways not necessary to enumerate.

Having thus described my invention, what I claim as new, and wish to secure by Letters Patent, is—

1. In an unloader for wagons the combination of a wagon-box, a conveyer secured to the bottom of said wagon-box, and a flexible lining for said wagon-box, secured to the sides of said conveyer, substantially as described.

2. In an unloader for wagons, in combination with a box, a conveyer secured to the bottom of said box, a flexible lining for said box secured to the sides of said conveyer, and a false bottom in said box covering said conveyer, substantially as described.

In testimony whereof I have hereunto set my hand in presence of two subscribing witnesses.

WOODSON BARCLAY.

Witnesses:
DAVID R. SIMPSON,
FRANK B. CARRIEL.